US010533558B2

(12) United States Patent
Melo et al.

(10) Patent No.: US 10,533,558 B2
(45) Date of Patent: Jan. 14, 2020

(54) CENTRIFUGAL PUMP WITH ADAPTIVE PUMP STAGES

(71) Applicant: Saudi Arabian Oil Company, Dhahran (SA)

(72) Inventors: Rafael Adolfo Lastra Melo, Dhahran (SA); Chidirim Enoch Ejim, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 260 days.

(21) Appl. No.: 15/645,839

(22) Filed: Jul. 10, 2017

(65) Prior Publication Data

US 2018/0172010 A1 Jun. 21, 2018

Related U.S. Application Data

(60) Provisional application No. 62/437,249, filed on Dec. 21, 2016.

(51) Int. Cl.
*F04D 15/00* (2006.01)
*F04D 1/06* (2006.01)
(Continued)

(52) U.S. Cl.
CPC ........... *F04D 15/0038* (2013.01); *F04D 1/06* (2013.01); *F04D 13/10* (2013.01); *F04D 29/026* (2013.01);
(Continued)

(58) Field of Classification Search
CPC .. F04D 15/0038; F04D 29/468; F04D 29/247; F04D 29/362; F04D 29/368;
(Continued)

(56) References Cited

U.S. PATENT DOCUMENTS 2,845,869 A * 8/1958 Herbenar ............ F04D 15/0061 415/12
3,038,698 A * 6/1962 Troyer .................... F01D 5/148 415/12
(Continued)

FOREIGN PATENT DOCUMENTS

CN 103185025 A * 7/2013
CN 103835988 B * 1/2016
(Continued)

OTHER PUBLICATIONS

International Search Report and Written Opinion in International Application No. PCT/US2017/066019 dated Mar. 15, 2018, 14 pages.

*Primary Examiner* — Richard A Edgar
*Assistant Examiner* — Topaz L. Elliott
(74) *Attorney, Agent, or Firm* — Fish & Richardson P.C.

(57) ABSTRACT

A centrifugal pump with adaptive pump stages includes an impeller configured to provide kinetic energy to fluid flow through the pump. The impeller has multiple geometric dimensions. The pump includes a diffuser connected to the impeller that is configured to convert the kinetic energy provided by the impeller into static pressure energy to flow the fluid through the pump. The pump includes an adaptive material attached to the impeller that is configured to modify, during operation of the pump, a geometric dimension to modify fluid flow through the pump.

22 Claims, 4 Drawing Sheets

(51) Int. Cl.

| | |
|---|---|
| ***F04D 29/22*** | (2006.01) |
| ***F04D 29/46*** | (2006.01) |
| ***F04D 13/10*** | (2006.01) |
| ***F04D 29/02*** | (2006.01) |
| ***F04D 29/24*** | (2006.01) |

(52) U.S. Cl.
CPC ....... *F04D 29/2272* (2013.01); *F04D 29/247* (2013.01); *F04D 29/466* (2013.01); *F04D 29/468* (2013.01); *F05D 2260/407* (2013.01); *F05D 2300/505* (2013.01); *F05D 2300/507* (2013.01)

(58) Field of Classification Search
CPC ...... F04D 29/382; F04D 29/466; F04D 29/46; F04D 13/10; F05D 2300/505; F05D 2300/507; F05D 2260/407
See application file for complete search history.

(56) References Cited

U.S. PATENT DOCUMENTS

| | | | | |
|---|---|---|---|---|
| 4,139,330 A | 2/1979 | Neal | | |
| 5,169,286 A * | 12/1992 | Yamada | F01P 5/10 | 277/558 |
| 6,547,519 B2 | 4/2003 | deBlanc et al. | | |
| 6,755,609 B2 * | 6/2004 | Preinfalk | F04D 15/0027 | 415/119 |
| 7,275,711 B1 * | 10/2007 | Flanigan | B64C 27/18 | 244/17.11 |
| 8,506,257 B2 * | 8/2013 | Bottome | F01D 5/147 | 416/132 A |
| 2003/0185676 A1 * | 10/2003 | James | F04D 1/063 | |
| 2013/0051977 A1 * | 2/2013 | Song | E21B 43/128 | 415/1 |
| 2013/0066139 A1 * | 3/2013 | Wiessler | A61B 17/32072 | 600/16 |
| 2014/0209291 A1 | 7/2014 | Watson et al. | | |
| 2014/0341714 A1 | 11/2014 | Casa | | |
| 2018/0066671 A1 * | 3/2018 | Murugan | F04D 27/0246 | |
| 2018/0172020 A1 * | 6/2018 | Ejim | E21B 43/128 | |

FOREIGN PATENT DOCUMENTS

| | | | | |
|---|---|---|---|---|
| DE | 2260678 A1 * | 6/1974 | F04D 15/0061 |
| DE | 3022241 A1 * | 12/1981 | F04D 29/247 |
| DE | 19654092 | 7/1998 | |
| DE | 10307887 | 10/2004 | |
| DE | 102007005426 | 5/2008 | |
| DE | 102008054766 | 6/2010 | |
| JP | 2005076486 A * | 3/2005 | |
| RU | 98500 U1 * | 10/2010 | |
| RU | 178531 U1 * | 4/2018 | |

* cited by examiner

CENTRIFUGAL PUMP WITH ADAPTIVE PUMP STAGES

CROSS REFERENCE TO RELATED APPLICATIONS

This application claims the benefit under 35 U.S.C. § 119(e) of U.S. Patent Application No. 62/437,249, entitled "CENTRIFUGAL PUMP WITH ADAPTIVE STAGES," filed Dec. 21, 2017, which is incorporated herein by reference in its entirety.

TECHNICAL FIELD

This disclosure relates to pumps, for example, centrifugal pumps.

BACKGROUND

Centrifugal pumps increase the pressure of transported fluid by converting rotational kinetic energy into hydrodynamic energy. The energy is provided by an external engine or electrical motor.

Centrifugal pumps are efficient for their physical size making them useful in places with a limited footprint such as a ship, wellbore, or municipal water system.

SUMMARY

This disclosure describes a centrifugal pump with adaptive pump stages.

An example implementation of the subject matter described within this disclosure is a pump with the following features. An impeller provides kinetic energy to flow fluid through the pump. The impeller has multiple geometric dimensions. A diffuser is connected to the impeller. The diffuser converts the kinetic energy provided by the impeller into static pressure energy to flow the fluid through the pump. An adaptive material is attached to the impeller. The adaptive material is capable of modifying, during operation of the pump, a geometric dimension of the multiple geometric dimensions in order to modify fluid flow through the pump.

Aspects of the example implementation, which can be combined with the example implementation alone or in combination, include the following. The geometric dimensions include an impeller outer diameter and an impeller blade trailing edge angle.

Aspects of the example implementation, which can be combined with the example implementation alone or in combination, include the following. The impeller includes an impeller blade having the impeller blade trailing edge angle. The adaptive material is configured to increase or decrease the impeller blade trailing edge angle during operation of the pump.

Aspects of the example implementation, which can be combined with the example implementation alone or in combination, include the following. A leading edge or a trailing edge of the impeller blade is made of the adaptive material.

Aspects of the example implementation, which can be combined with the example implementation alone or in combination, include the following. A trailing region of the impeller blade is made of the adaptive materials.

Aspects of the example implementation, which can be combined with the example implementation alone or in combination, include the following. The adaptive materials comprise properties configured to change in response to an external stimulus including at least one of stress, temperature, moisture, pH, electric field or magnetic field.

Aspects of the example implementation, which can be combined with the example implementation alone or in combination, include the following. The adaptive materials include a piezoelectric material, a magnetostrictive material, or a shape memory material configured to modify the geometric dimension in response to an outside stimulus.

Aspects of the example implementation, which can be combined with the example implementation alone or in combination, include the following. An electric charge source is connected to the impeller. The electric charge source provides the electric charge to modify the geometric dimension.

Aspects of the example implementation, which can be combined with the example implementation alone or in combination, include the following. A magnetic field source is connected to the impeller. The magnetic field source provides the magnetic field to modify the geometric dimension.

Aspects of the example implementation, which can be combined with the example implementation alone or in combination, include the following. A pump condition during the operation of the pump under which the adaptive materials modify the geometric dimension includes a pump temperature during the operation of the pump.

Aspects of the example implementation, which can be combined with the example implementation alone or in combination, include the following. The adaptive materials include at least one of pH-sensitive polymers, temperature-responsive polymers, magnetorheological fluids, electroactive polymers, or thermoelectric materials.

Aspects of the example implementation, which can be combined with the example implementation alone or in combination, include the following. The impeller is a first impeller, the diffuser is a first diffuser, the first impeller and the first diffuser form a first pump stage, wherein the pump further includes a second pump stage connected in series with the first pump stage. The second pump stage includes a second impeller that provides kinetic energy to flow fluid through the pump. The second impeller has multiple geometric dimensions. A second diffuser is connected to the second impeller. The second diffuser converts the kinetic energy provided by the second impeller into static pressure energy to flow the fluid through the pump.

Aspects of the example implementation, which can be combined with the example implementation alone or in combination, include the following. The second pump stage does not include adaptive materials.

Aspects of the example implementation, which can be combined with the example implementation alone or in combination, include the following. An adaptive material is attached to the diffuser. The adaptive material attached to the diffuser is configured to modify, during operation of the pump, a geometric dimension of the diffuser in order to modify fluid flow through the pump.

An example implementation of the subject matter described within this disclosure is a method with the following features. An adaptive material is attached to an impeller of a pump. The impeller provides kinetic energy to flow fluid through the pump. The impeller has multiple geometric dimensions. The adaptive material is configured to modify, during operation of the pump, a geometric dimension to modify fluid flow through the pump. Wherein the impeller is connected to a diffuser that converts the kinetic energy provided by the impeller into static pressure energy to flow the fluid through the pump. The adaptive material is actuated during the operation of the pump to modify the geometric dimension of the impeller.

Aspects of the example method, which can be combined with the example method alone or in combination, include the following. The geometric dimensions include an impeller outer diameter and an impeller blade trailing edge angle.

Aspects of the example method, which can be combined with the example method alone or in combination, include the following. The impeller includes an impeller blade having the impeller blade trailing edge angle. The adaptive material is configured to increase or decrease the impeller blade trailing edge angle during operation of the pump.

Aspects of the example method, which can be combined with the example method alone or in combination, include the following. The impeller includes an impeller blade with the impeller blade leading edge angle. The adaptive material is configured to increase or decrease the impeller blade leading edge angle during operation of the pump.

Aspects of the example method, which can be combined with the example method alone or in combination, include the following. The diffuser includes a diffuser blade having the diffuser blade trailing edge angle. The adaptive material is configured to increase or decrease the diffuser blade trailing edge angle during operation of the pump.

Aspects of the example method, which can be combined with the example method alone or in combination, include the following. The impeller includes a diffuser blade with the diffuser blade leading edge angle. The adaptive material is configured to increase or decrease the diffuser blade leading edge angle during operation of the pump.

Aspects of the example method, which can be combined with the example method alone or in combination, include the following. The adaptive materials include properties that change in response to temperature.

Aspects of the example method, which can be combined with the example method alone or in combination, include the following. The adaptive materials include properties that change in response to pump conditions during the operation of the pump.

Aspects of the example method, which can be combined with the example method alone or in combination, include the following. The adaptive materials include a piezoelectric material, a magnetostrictive material, or a shape memory material configured to modify the geometric dimension in response to an outside stimulus.

Aspects of the example method, which can be combined with the example method alone or in combination, include the following. The shape memory materials include at least one of pH-sensitive polymers, temperature-responsive polymers, magnetorheological fluids, electroactive polymers or thermoelectric materials.

Aspects of the example method, which can be combined with the example method alone or in combination, include the following. Actuating the adaptive material during the operation of the pump to modify the geometric dimension of the impeller includes applying an electric charge or magnetic field to the adaptive material to modify the geometric dimension.

DESCRIPTION OF DRAWINGS

Like reference symbols in the various drawings indicate like elements.

DETAILED DESCRIPTION

A centrifugal pump includes pump stages, each of which is defined as sections of a centrifugal pump consisting of one impeller that rotates and a diffuser with a set of stationary vanes downstream of the impeller. The fluid enters the inlet towards the center of the impeller and flows along the blades, where the fluid is accelerated radially outwards into the diffuser that transforms rotational energy into pressure. The impeller determines the pump performance. The speed and geometry of the impeller, that is, diameter, number and shape of the blades, and inlet and outlet width determine operating point, head, and efficiency. Pump variants are often created by slightly modifying the impeller geometry.

Centrifugal pumps are designed and sized for a narrow operating envelope. Examples of process parameters that are taken into account when designing a centrifugal pump include: flow rate, head, suction pressure, discharge pressure, viscosity, abrasive content, corrosiveness, power, specific gravity, and many others. If one of these parameters in a process changes significantly, then the pump operation has to be adjusted to match the current process conditions.

This disclosure describes a centrifugal pump with an adaptable pump stage which includes an adaptable impeller, an adaptable diffuser, or both. The adaptability of the pump stages can be achieved through adaptive materials that can either be self-actuated or actuated from an external stimulus. The adaptability allows the pump to have its pump curve adjusted to better fit changing process conditions including optimum power efficiency for a wider range of operation and better response to changes in fluid density.

Figure 1A:
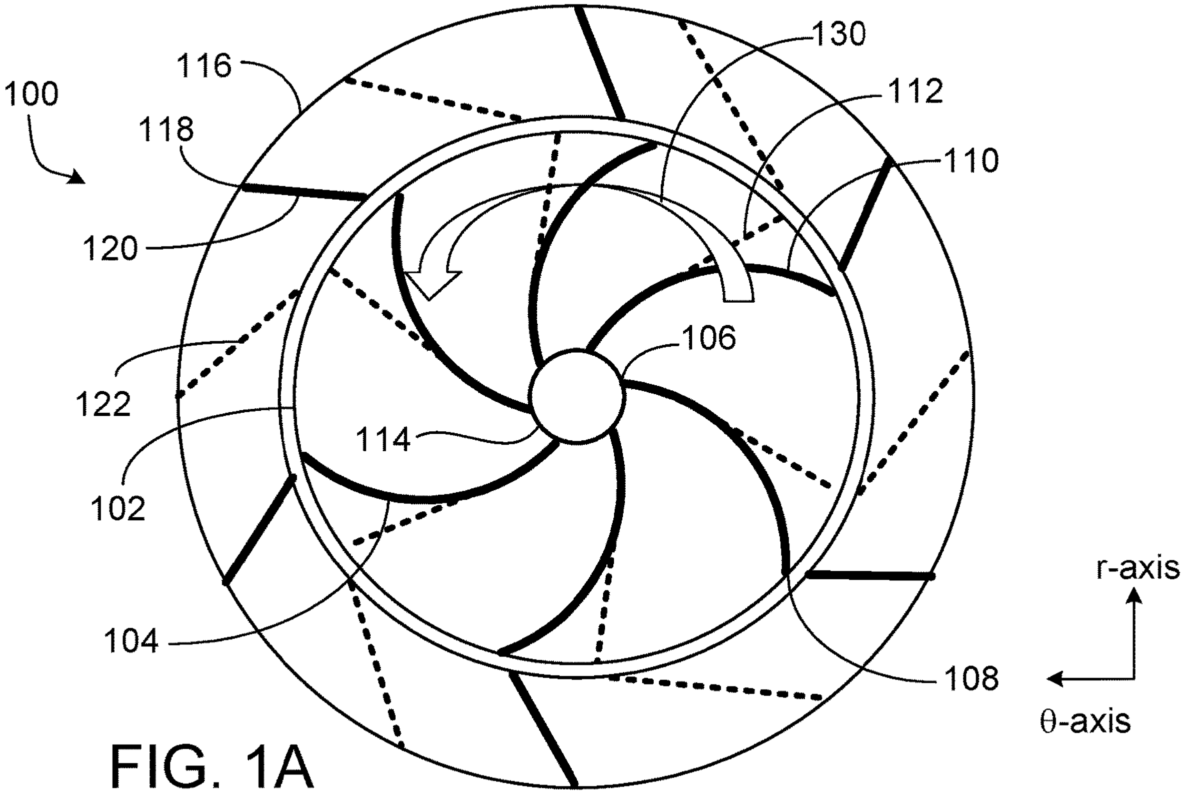
FIGS. 1A-1B are schematics of an example adaptable centrifugal pump stage.

FIG. 1A shows an example adaptable centrifugal pump stage 100. A pump impeller 102 has a set of axisymmetric impeller vanes 104 on its surface. The vanes have a leading edge 106 and a trailing edge 108. The vanes on the pump impeller 102 are adjustable from a first geometry 110 to a second geometry 112. The impeller vanes 104 on the pump impeller 102 can be adjusted to any position between the first geometry 110 and the second geometry 112. The entire impeller 102 rotates about an axis through its center. Fluid enters the impeller through the eye 114 located at the suction of the pump. A diffuser 116 (implemented as a ring outside of the impeller 102 and is shown for illustration in this view) is stationary and helps direct the fluid flowing off the impeller 102. The diffuser 116 has diffuser vanes 118 that are similar to the impeller vanes 104 on the impeller 102. The diffuser vanes 118 are capable of changing their orientation from a first geometry 120 to a second geometry 122. The diffuser vanes 118 on the pump diffuser 116 can be adjusted to any position between the first geometry 120 and the second geometry 122. The geometry of the diffuser vanes 118 is coupled to the geometry of the impeller vanes 104. That is, as the impeller vanes transition from the first geometry 110 to a second geometry 112, the diffuser vanes will also transition from their first geometry 120 to their second geometry 122. This ensures that the diffuser 116 properly redirects the flow coming off of the impeller 102. In the implementation shown in FIG. 1A, the impeller 102 has a direction of rotation 130 in a counter-clockwise direction while the diffuser 116 remains stationary. The pump stage 100 may also have a charge source and controller that applies a stimulus to an adaptive material in order to initiate the transition between geometries.

Figure 1B:
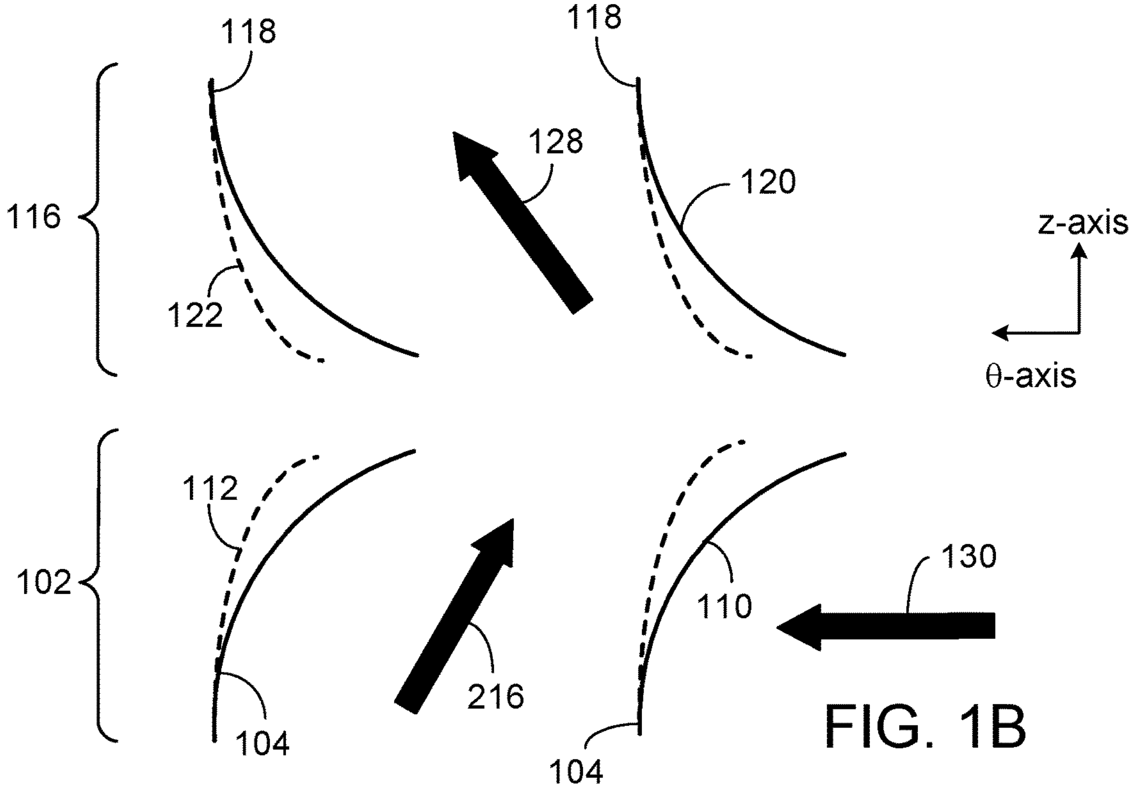

FIG. 1B shows the axial view of an impeller and diffuser blades in the θ-z plane to further illustrate the view shown in FIG. 1A. The impeller vanes 104 are shown with a direction of motion 130 towards the left side of the figure while the diffuser vanes 118 are shown as stationary. The impeller fluid flow 216 flows from the impeller eye 114 outwards towards the diffuser. The fluid then passes to the diffuser 116 where the diffuser fluid flow 128 is channeled radially inwards and also in an axial direction until it is directed to a next impeller downstream or to a pump discharge. In some implementations, a volute can be used to direct the fluid flow towards a pump discharge.

Figure 2:
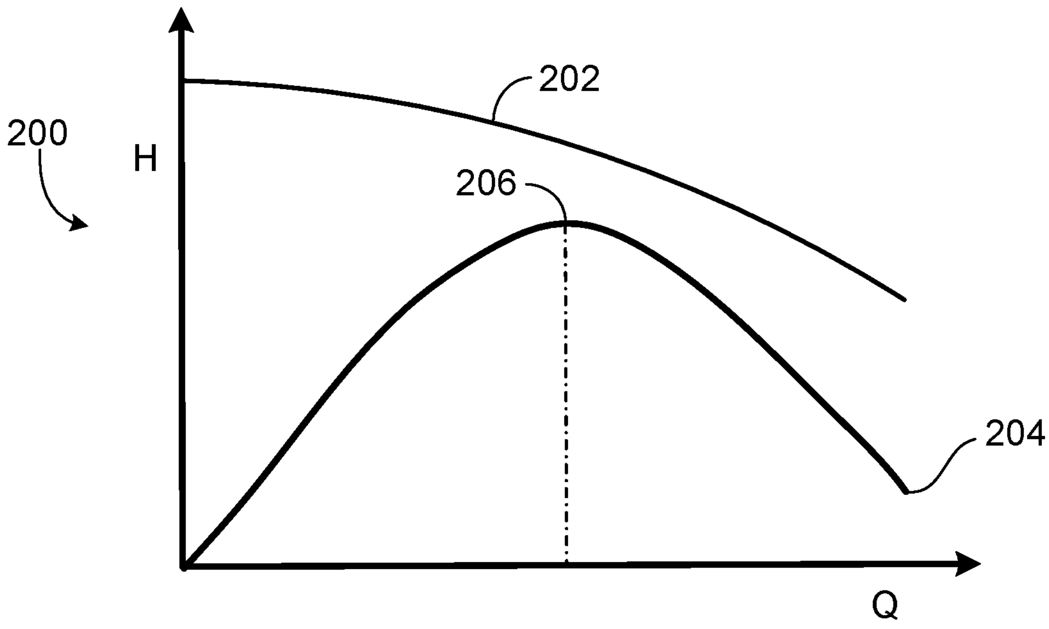
FIG. 2 is an example of a performance map for a centrifugal pump without an adaptive stage.

FIG. 2 shows an example performance map 200 of a centrifugal pump without an adaptable pump stage. The X-axis displays flow-rate (Q) while the Y-axis shows head (H), which is the total height of a fluid column that the pump is capable of lifting. Units of head are typically given in units of length, such as feet or meters. The pump curve 202 shows the pump's flow output for a given head and vice versa. An efficiency curve 204 indicates the efficiency of the pump at a given flow-rate. The efficiency curve is often displayed with the pump curve with its Y-axis displayed as a percentage. The percentage is an indication of how much of the mechanical energy supplied to the impeller is converted into hydraulic energy. The pump is most efficient at its best efficiency point (BEP) 206, but depending on the spec the pump is built to, it can run a certain percentage (of flow) off of BEP 206.

Operating centrifugal pumps near the BEP 206 is preferable for a variety of reasons. As a pump moves away from the BEP 206, less of the kinetic energy imparted to the fluid is converted into hydraulic energy and more is converted into heat. This excess heat causes accelerated wear on the pump and will reduce the mean-time-between-failures (MTBF). On top of the heat generation, running the pump away from the BEP can cause cavitation, increased power requirements, increased thrust loads, increased radial loads, and can create vibration issues within the pump. All of these issues can reduce MTBF and increase operating costs.

Figure 3:
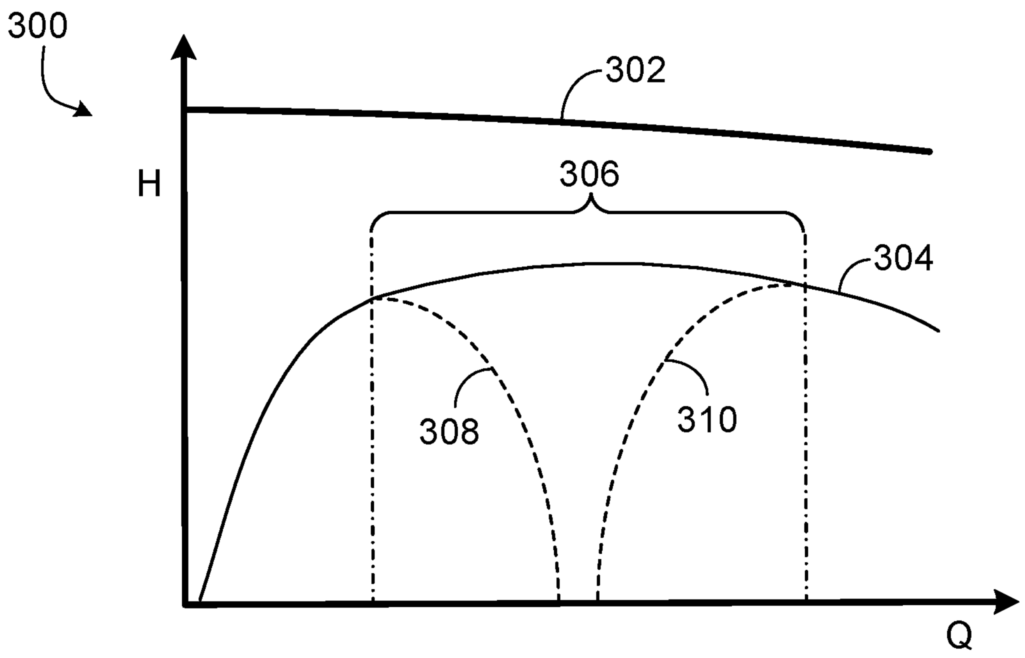
FIG. 3 is an example of a performance map for a centrifugal pump with an adaptable pump stage.

FIG. 3 shows an example performance map 300 of a centrifugal pump with an adaptable pump stage. Like FIG. 2, the X-axis displays flow-rate (Q) while the Y-axis shows head (H). A pump curve 302 shows the pump's flow output for a given head and vice versa. An efficiency curve 304 indicates the efficiency of the pump at a given flow-rate. Unlike the pump represented by the performance map 200, the pump represented by performance map 300 does not have a peak in the efficiency curve 304; rather, the pump has a best efficiency range (BER) 306.

The pump curve 302 is more level than pump curve 202, meaning that the adaptable pump is able to deliver a variety of flow-rates at a nearly constant head. In other words, operating the pump within the BER 306 allows the pump to deliver fluid at a constant head into a downstream process even if the flow varies at the pump suction. Such an ability is useful in oil production applications where flow rates vary and wells are known to slug. In addition, the performance map 300 has a wider efficiency curve than performance map 200, giving the pump a comparatively greater operable range without suffering the typical issues that cause a shortening in the pumps MTBF.

The straightening of the impeller vanes 104 on the impeller 102 from geometry 110 to geometry 112 results in a change in the impeller and diffuser blade angles, which gives a corresponding increase in head and causes a pump curve to level-out. An efficiency curve shifts with every change in impeller exit blade angle and diffuser inlet blade entry angle. Efficiency curve 308 shows the efficiency at, for example, the first impeller geometry 110 and a first diffuser geometry 120, while efficiency curve 310 shows the efficiency at, for example, the second impeller geometry 112 and a second diffuser geometry 122. As the impeller geometry is actuated from a first geometry 110 to a second geometry 112, the efficiency curve will shift as well; the efficiency curve 304 is essentially a composite of all of those possible efficiency curves for the adaptable impeller 102 with vanes 104 that can vary from geometry 110 to geometry 112. As the pump impeller vanes 104 actuate, the diffuser of the same pump stage can actuate as well to maintain a pump efficiency across a wide range of flow-rates.

The adaptive pump impeller can be made using a combination of impeller materials, such as steel, and a shape memory material (SMM), such as a shape memory polymer (SMP) or shape memory alloy (SMA). SMPs are materials in which large deformation can be induced and recovered using external stimuli, trigger, activation, or actuation. Such activation can be from thermal, light, magnetic, or electrical effects.

In implementations in which an SMP is activated by thermal changes, the SMP is first engineered and fabricated to its desired permanent shape. The fabrication can be done with a variety of methods, including molding and curing. The desired temporary shape is processed after the initial fabrication of the item.

In the initial fabrication, the manufactured permanent shape is heated to above the glass transition temperature ($T_g$) of the SMP. Subsequently, a load is applied to the SMP to deform it to the target temporary shape. With the SMP still loaded or constrained in its temporary shape, it is cooled below its glass transition temperature ($T_g$), such as near room temperature. After reaching room temperature, the load or constraint is removed and the SMP retains this temporary shape. The adaptive blade of the impeller will have this temporary shape when an adaptive pump stage 100 is assembled. For SMPs engineered and manufactured with a one-way shape memory effect, when the temporary shape is heated to a temperature above the SMP's glass transition temperature, the SMP is transformed to its permanent shape. For SMPs engineered and manufactured with a two-way shape memory effect, when the temporary shape is heated to a temperature above the SMP's glass transition temperature, the SMP is transformed to its permanent shape. However, cooling the SMP below its glass transition temperature causes the SMP to revert back to its temporary shape.

As disclosed earlier, another example of SMM are SMAs, which are metallic alloys with similar characteristics as SMPs and that exhibit one-way and two-way shape memory effects. An SMA with two-way memory can be manufactured such that the engineered permanent shape is shaped into a temporary shape at a high temperature above the SMA's transformation temperature. When cooled, the SMA retains its temporary shape. When heated above its transformation temperature, it changes back to its permanent shape. When cooled below its transition temperature, it reverts back to its temporary shape. The SMA has this temporary shape during pump assembly.

Figure 4A:
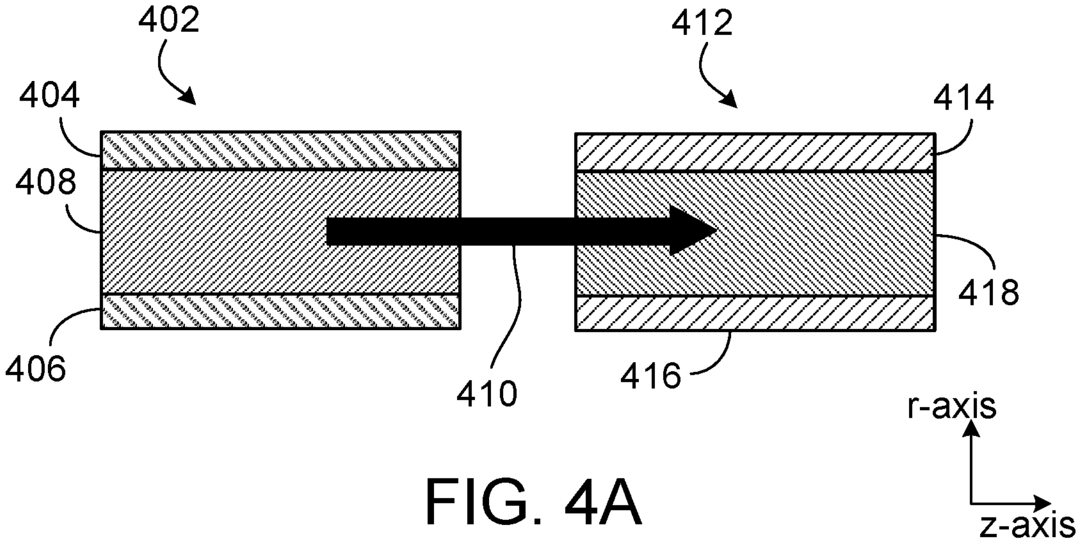
FIG. 4A is a schematic of an example pump impeller and a diffuser.

The blades of impellers and diffusers can be encased within a shroud. The upper shroud is in contact with the top portion of a blade, whereas the lower shroud is in contact with the lower portion of a blade. FIG. 4A shows a side view across the z-r plane of an exit region of an impeller 402 and an inlet region of a diffuser 412 next to one another. In the illustrated implementation, the impeller 402 is a closed impeller. The impeller 402 includes an impeller upper shroud 404 and an impeller lower shroud 406. Between the impeller upper shroud 404 and the impeller lower shroud 406 is an impeller blade 408. The impeller upper shroud 404 and the impeller lower shroud 406 enclose the fluid flow 410 flowing from an impeller eye 424 (shown in FIG. 4C), through an impeller exit, and toward diffuser 412. In the illustrated implementation, diffuser 412 is a closed diffuser. The diffuser 412 includes a diffuser upper shroud 414 and a diffuser lower shroud 416. Between the diffuser upper shroud 414 and the diffuser lower shroud 416 is a diffuser blade 418. The diffuser upper shroud 414 and the diffuser lower shroud 406 enclose the fluid path leading from the impeller 402 to another impeller downstream (not shown) or to the pump discharge (not shown).

Figure 4B:
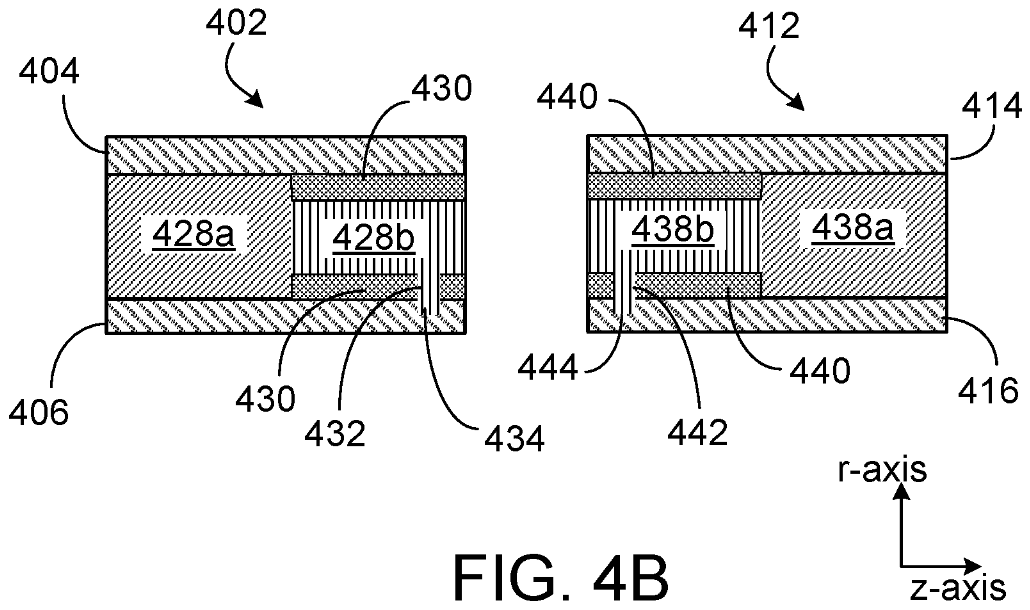
FIG. 4B is a schematic of an example adaptable pump impeller and an adaptable diffuser utilizing temperature-responsive materials.

In some implementations, such as the implementation shown in FIG. 4B, only a portion of either the impeller blade 428 or the diffuser blade 438 is formed from an SMM. In some implementations, a stationary portion of an impeller blade 428*a* extends from the impeller eye 424 (FIG. 4C) to a radius between the impeller eye 424 (FIG. 4C) and the outer diameter of the impeller 402. The movable portion of the impeller blade 428*b* extends from the outer edge of the stationary portion of an impeller blade 428*a* to the outer edge of the impeller 402. In some implementations, the outer tip of the impeller blade may extend beyond the outer edge of the impeller or not extend fully to the outer edge of the impeller. The movable portion of the impeller blade 428*b* has an impeller blade tab 432 that extends into impeller blade notch 434. The impeller blade notch 434 is formed within the impeller lower shroud 406 and is configured to receive the impeller blade tab 432.

The diffuser 412 shown in FIG. 4B has a similar blade arrangement to the impeller 402. The diameter of the inlet of the diffuser 412 and that of the outlet of the impeller 402 can be substantially equal. The diameter of the outlet of the diffuser 412 can be less than the diameter of the inlet of the diffuser 412. In the illustrated implementation, a stationary portion of a diffuser blade 438*a* extends from the inner edge of the diffuser 412 to a radius between inner edge of the diffuser 412 and the outer diameter of the diffuser 412. The movable portion of the diffuser blade 438*b* extends from the outer edge of the stationary portion of a diffuser blade 438*a* to the outer edge of the diffuser 412. In some implementations, the outer tip of the diffuser blade may extend beyond the outer edge of the diffuser or not extend fully to the outer edge of the diffuser. The movable portion of the diffuser blade 438*a* has a diffuser blade tab 442 that extends into diffuser blade notch 444. The diffuser blade notch 444 is formed within the diffuser lower shroud 416 and is configured to receive the diffuser blade tab 442.

Figure 4C:
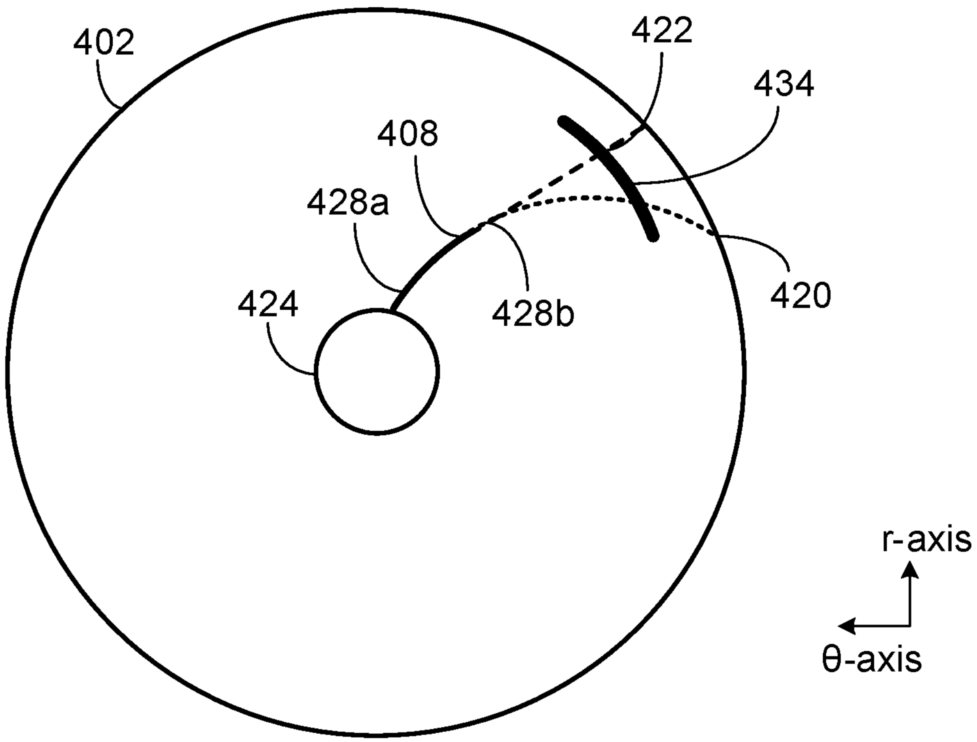
FIG. 4C is a schematic of an example adaptable pump impeller utilizing temperature-responsive materials.

Between the movable portion of the impeller blade 428*b* and either the upper impeller shroud 404 or the lower impeller shroud 406 or both, there can be an impeller elastomeric material 430. The elastomeric material 430 serves as a seal to prevent migration of fluid from one blade cavity to another to help maintain pump efficiency and is attached to both a shroud and the movable portion of the impeller blade 428*b*. The elastomeric material 430 is flexible enough to maintain its sealing ability as the movable portion of the impeller blade 428*b* moves from a first geometry 420 to a second geometry 422 (FIG. 4C). Between the movable portion of the diffuser blade 438*b* and either the upper diffuser shroud 414 or the lower diffuser shroud 416 or both, there can be a diffuser elastomeric material 440. The diffuser elastomeric material 440 serves as a seal to prevent migration of fluid from one blade cavity to another to help maintain pump efficiency within the diffuser. The diffuser elastomeric material 440 is flexible enough to maintain its sealing ability as the movable portion of the diffuser blade 438*b* moves from a first geometry to a second geometry.

FIG. 4C. shows a top view across of impeller 402 with a single impeller blade 408. Impeller blade 408 includes both a stationary portion of an impeller blade 428*a*. and a movable portion of the impeller blade 428*b*. The movable portion of the impeller blade 428*b* is constructed of an SMM and is able to shift from a first geometry 420 to a second geometry 422. The impeller notch 434 guides movable portion of the impeller blade 428*b* between the first geometry 420 and the second geometry 422. In some implementations, an upper impeller notch can be included on the upper impeller shroud 404 in addition or as an alternative to the impeller notch 434. As was previously discussed, changes in impeller blade geometry can be accompanied by a diffuser blade change in geometry to maintain pump efficiency. In some implementations, an upper diffuser notch can be included on the upper diffuser shroud 414 in addition or as an alternative to the diffuser notch 444. The SMM can be actuated by thermal changes in the process fluid.

In downhole oilfield applications, for a pump operating at a given rotational speed and at BEP, when pump flowrate increases, pump head, as well as efficiency decreases, as shown in FIG. 2. The decrease in efficiency causes a corresponding increase in pump temperature due to conversion of some of the pump hydraulic power into heat. The increase in heat raises the pump temperature. Before the temperature increase, the adaptable impeller blades 428 and the adaptable diffuser blades 438 have a temporary shape, such as the first geometry 420 shown in FIG. 4C. As the SMM's temperature exceeds its $T_g$ the adaptable impeller blades 428 slide within the impeller notch 434 along the circumferential curved-path on the impeller lower shroud 406 from the temporary shape position (first geometry 420) with exit blade angle less than 90°, such as 60°, to the permanent shape with exit blade angle up to 90°. As mentioned previously, the diffuser inlet blade 438 angle needs to be aligned accordingly to receive the flow from the impeller 402. Due to the close proximity of the impeller exit and diffuser inlet, the temperature is the same for both sets of blades. As a result, the corresponding inlet blade angle of the adaptive diffuser blade 438 also changes from its temporary shape (first geometry) to a permanent shape (second geometry). The increase in blade angle increases the head of the pump, which increases the hydraulic power and the corresponding efficiency of the pump. With the efficiency restored, once the pump temperature falls below the SMM's $T_g$, the adaptive portions of the blades revert back from their permanent shape back to their temporary shape. This causes a reduction in blade exit angle of the impeller, reduces the corresponding head, and reduces the efficiency of the pump. The two-way shape memory effect of the SMM therefore allows changing of the blades to accommodate operational needs.

There are a number of adaptive materials that can be utilized for an adaptive pump stage. Examples include piezoelectric materials, magnetostrictive materials, shape-memory alloys, shape-memory polymers, pH-sensitive polymers, temperature-responsive polymers, magnetorheological fluid, electroactive polymers, thermoelectric materials, and other adaptive materials. Any of these materials can be used either alone or in any combination to achieve the desired performance of the adaptable pump stage.

Piezoelectric materials produce electrical charge when stress is applied. The effect is also reversible, when a voltage is applied the materials deform. Piezoelectric materials can be used to build adaptive stages to make certain sections bend, expand, or contract when a voltage signal is applied from the charge source and controller. In some implementations, the leading or trailing regions of the blade are made of piezoelectric materials and can be actively adjusted using a voltage signal that is produced by a control piezoelectric surface located in the inlet of the pump. Such a design provides the stage with the ability to auto-adjust the shape of the blade as a function of the flow rate, sand, or other debris in the fluid.

Electroactive polymers exhibit a change in size or shape when stimulated by an electric field. Electroactive polymers can be used in similar application to the one described for piezoelectric materials. An impeller can look like the impeller of FIG. 4C in which adaptive material includes the electroactive polymers.

Thermoelectric materials are used to build devices that convert temperature differences into electricity and vice versa. Thermoelectric materials can be used in combination with piezoelectrical materials to achieve changes in performance with changes in fluid temperature. An impeller can look like the impeller of FIG. 4C in which the charge source and controller can utilize thermoelectric materials in its construction.

Magnetostrictive materials change shape when a magnetic field is applied. Another implementation of this disclosure has the leading or trailing regions of the blade made of magnetostrictive materials and can be actively adjusted using external electromagnets located in the housing of the pump. The electromagnets can be powered from the surface of the wellbore using the same ESP cable and can be controlled using the motor voltage or frequency. Control signals can also be transmitted along with electrical power to a control box downhole.

Magnetorheological fluids are fluids that change from a fluid state to a near-solid state when exposed to a magnetic force. Magnetorheological fluids can be used in a similar application to the one described for magnetostrictive materials. Since the magnetorheological fluids are fluid, they can be used in combination with other materials. A controller that provides a magnetic stimulus could be used to control the magnetostrictive material, the magnetorheological fluids, or both. An impeller can look like the impeller of FIG. 4C in which adaptive material includes the magnetostrictive materials or magnetorheological fluids.

Shape-memory alloys and shape-memory polymers are materials in which large deformation can be induced and recovered through temperature or stress changes. Another implementation of this disclosure has the leading or trailing regions of the blade made of shape-memory materials and can be actively adjusted using changes in the temperature of the impeller. Changes of temperature of the impeller may be a result of flow rate change, fluid density change, gas slugging, or due to other process-related changes. In such implementations, the change in the memory materials is designed such that changes in temperature change the leading or trailing angles of the blade to achieve optimal lifting and power efficiency for different operating conditions. An impeller can look like the impeller of FIG. 4C in which adaptive material includes the shape-memory alloys, shape-memory polymers, or both.

Certain polymers are pH-sensitive, for example, change in volume when the pH of the surrounding medium changes. Such adaptive materials can be used to change the pump performance in the presence of certain chemicals, for example, salts, asphaltenes, and paraffins. An impeller can look like the impeller of FIG. 4C in which the adaptive material includes the pH-sensitive polymers.

Temperature-responsive polymers are materials which undergo changes with temperature. Temperature-responsive polymers can be used in a similar application to the one described for shape memory materials. An impeller can look like the impeller of FIG. 4C in which the adaptive material includes the temperature-responsive polymers.

Figure 5:
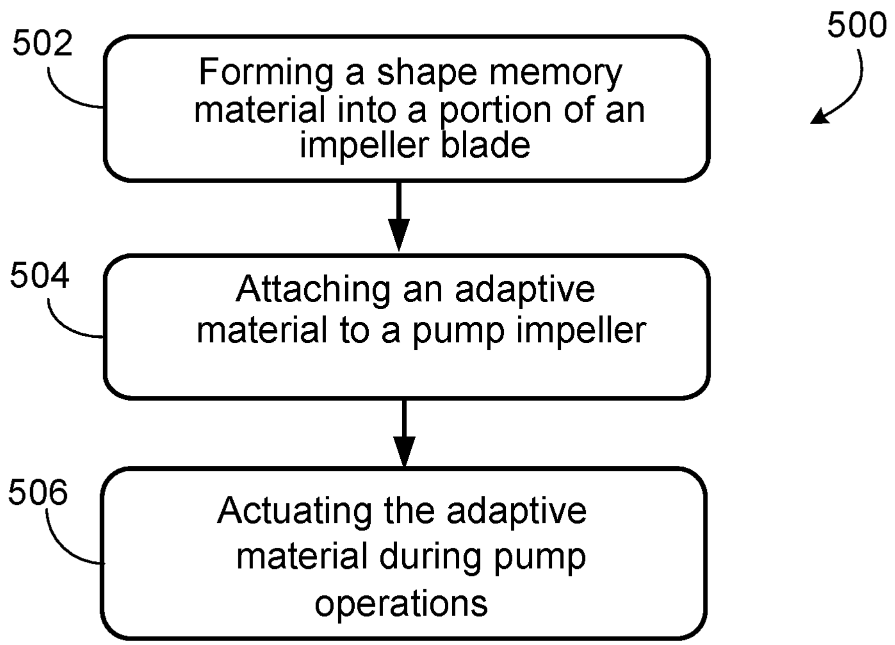
FIG. 5 is a flowchart of an example of a process to make an adaptable pump stage.

FIG. 5 shows a method 500 for manufacturing and utilizing a centrifugal pump with an adaptive stage. At 502, a shape memory material is formed into at least a portion of an impeller blade. Diffuser blades can be formed as well. At 504, an adaptive material, such as an SMM, is attached to a pump impeller. An adaptive material can be attached to a diffuser as well. The diffuser and impeller are combined into a pump stage. At 506, the adaptive material is actuated during pump operation.

A number of implementations have been described. Nevertheless, it will be understood that various modifications may be made without departing from the spirit and scope of the disclosure. For example, a multi-stage pump may contain both adaptable stages and traditional pump stages. Accordingly, other implementations are within the scope of the following claims.

What is claimed is:

1. A pump comprising:

a first impeller configured to provide kinetic energy to flow fluid through the pump, the first impeller having a plurality of geometric dimensions;

a first diffuser fluidly connected to the first impeller, the first diffuser configured to convert the kinetic energy provided by the first impeller into static pressure energy to flow the fluid through the pump; and an adaptive material attached to the first impeller, the adaptive material configured to modify, during operation of the pump, a geometric dimension of the plurality of geometric dimensions to modify fluid flow through the pump, wherein the first impeller and the first diffuser form a first pump stage, wherein the pump further comprises a second pump stage connected in series with the first pump stage, the second pump stage comprising:

a second impeller configured to provide kinetic energy to flow fluid through the pump; and a second diffuser fluidly connected to the second impeller, the second diffuser configured to convert the kinetic energy provided by the second impeller into static pressure energy to flow the fluid through the pump, wherein the second pump stage does not include adaptive materials.

2. The pump of claim 1, wherein the plurality of geometric dimensions modified by the adaptive material during the operation of the pump comprises an impeller outer diameter and an impeller blade trailing edge angle.

3. The pump of claim 2, wherein the first impeller comprises an impeller blade having the impeller blade trailing edge angle, wherein the adaptive material is configured to increase or decrease the impeller blade trailing edge angle during operation of the pump.

4. The pump of claim 3, wherein a leading edge or a trailing edge of the impeller blade is made of the adaptive material.

5. The pump of claim 3, wherein a trailing region of the impeller blade is made of the adaptive material.

6. The pump of claim 1, wherein the adaptive material comprises properties configured to change in response to an external stimulus including at least one of stress, temperature, moisture, pH, electric field or magnetic field.

7. The pump of claim 1, wherein the adaptive material comprises a piezoelectric material, a magnetostrictive material, or a shape memory material configured to modify the geometric dimension in response to an outside stimulus.

8. The pump of claim 1, further comprising an electric charge source connected to the first impeller, the electric charge source configured to provide an electric charge to modify the geometric dimension.

9. The pump of claim 1, further comprising a magnetic field source connected to the first impeller, the magnetic field source configured to provide a magnetic field to modify the geometric dimension.

10. The pump of claim 1, wherein, during the operation of the pump, a pump condition under which the adaptive material modifies the geometric dimension comprise a pump temperature.

11. The pump of claim 1, wherein the adaptive material includes at least one of pH-sensitive polymers, temperature-responsive polymers, magnetorheological fluids, electroactive polymers, or thermoelectric materials.

12. The pump of claim 1, further comprising an adaptive material attached to the first diffuser, the adaptive material attached to the first diffuser configured to modify, during operation of the pump, a geometric dimension of the first diffuser to modify fluid flow through the pump.

13. A method comprising:

forming a first pump stage of a pump by attaching an adaptive material to first impeller of pump, the first impeller configured to provide kinetic energy to flow fluid through the pump, the first impeller having a plurality of geometric dimensions, the adaptive material configured to modify, during operation of the pump, a geometric dimension of the plurality of geometric dimensions to modify fluid flow through the pump, wherein the first impeller is fluidly connected to a first diffuser configured to convert the kinetic energy provided by the first impeller into static pressure energy to flow the fluid through the pump;

forming a second pump stage comprising a second impeller and a second diffuser fluidly connected to the second impeller, wherein the second pump stage does not include adaptive materials;

fluidly connecting the first pump stage and the second pump stage in series; and actuating the adaptive material during the operation of the pump to modify the geometric dimension of the first impeller.

14. The method of claim 13, wherein the plurality of geometric dimensions modified during the operation of the pump comprises an impeller outer diameter and an impeller blade trailing edge angle.

15. The method of claim 14, wherein the first impeller comprises an impeller blade having the impeller blade trailing edge angle, wherein the adaptive material is configured to increase or decrease the impeller blade trailing edge angle during operation of the pump.

16. The method of claim 13, wherein the first diffuser comprises a diffuser blade having a diffuser blade trailing edge angle, wherein the method further comprises attaching a second adaptive material to the diffuser blade to increase or decrease the diffuser blade trailing edge angle during operation of the pump.

17. The method of claim 16, wherein the diffuser blade comprises a diffuser blade leading edge angle, wherein the second adaptive material is configured to increase or decrease the diffuser blade leading edge angle during operation of the pump.

18. The method of claim 13, wherein the adaptive material comprises properties configured to change in response to temperature.

19. The method of claim 13, wherein the adaptive material comprises properties configured to change in response to pump conditions during the operation of the pump.

20. The method of claim 13, wherein the adaptive material comprises a piezoelectric material, a magnetostrictive material, or a shape memory material configured to modify the geometric dimension in response to an outside stimulus.

21. The method of claim 20, wherein the shape memory material includes at least one of pH-sensitive polymers, temperature-responsive polymers, magnetorheological fluids, electroactive polymers or thermoelectric materials.

22. The method of claim 13, wherein actuating the adaptive material during the operation of the pump to modify the geometric dimension of the first impeller comprises applying an electric charge or magnetic field to the adaptive material to modify the geometric dimension.

* * * * *